USO09635393B2

United States Patent
Lam et al.

(10) Patent No.: US 9,635,393 B2
(45) Date of Patent: Apr. 25, 2017

(54) METHODS, SYSTEMS, AND MEDIA FOR REMOTE RENDERING OF WEB CONTENT ON A TELEVISION DEVICE

(71) Applicant: Google Inc., Mountain View, CA (US)

(72) Inventors: Hin Chung Lam, New York, NY (US); Jiao Yang Lin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/586,669

(22) Filed: Dec. 30, 2014

(65) Prior Publication Data
US 2015/0189338 A1 Jul. 2, 2015

Related U.S. Application Data

(60) Provisional application No. 61/922,277, filed on Dec. 31, 2013.

(51) Int. Cl.
*H04N 7/173* (2011.01)
*H04N 21/2343* (2011.01)
(Continued)

(52) U.S. Cl.
CPC ........... *H04N 21/234327* (2013.01); *G06F 17/30905* (2013.01); *H04N 21/2355* (2013.01);
(Continued)

(58) Field of Classification Search
None
See application file for complete search history.

(56) References Cited

U.S. PATENT DOCUMENTS 5,862,260 A * 1/1999 Rhoads ............. G06F 17/30876
382/232
6,049,831 A 4/2000 Gardell et al.
(Continued)

FOREIGN PATENT DOCUMENTS

EP 2323048 5/2011

OTHER PUBLICATIONS

International Preliminary Report on Patentability and Written Opinion dated Jul. 14, 2016 in International Patent Application No. PCT/US2014/072847.
(Continued)

*Primary Examiner* — William J Kim
(74) *Attorney, Agent, or Firm* — Byrne Poh LLP

(57) ABSTRACT

Methods, systems, and media for remote rendering of Web content on a television device are provided. In some implementations, methods for remote rendering of Web content on a television device are provided, the methods comprising: sending a request for the Web content to a server, receiving, at a source device, a response corresponding to the request; generating a set of drawing commands based on the response; obtaining at least one encoded image based on the response; presenting the Web content on the source device; generating a plurality of content layers corresponding to the Web content, wherein the plurality of content layers including a first content layer comprises the set of drawing commands and a second content layer comprises the encoded image; transmitting the plurality of content layers; and causing the Web content to be presented on the television device based on the plurality of content layers.

21 Claims, 6 Drawing Sheets

(51) Int. Cl.
  *H04N 21/462*     (2011.01)
  *H04N 21/4782*    (2011.01)
  *H04N 21/81*      (2011.01)
  *H04N 21/2665*    (2011.01)
  *H04N 21/2381*    (2011.01)
  *H04N 21/61*      (2011.01)
  *H04N 21/4402*    (2011.01)
  *H04N 21/845*     (2011.01)
  *H04N 21/8543*    (2011.01)
  *G06F 17/30*      (2006.01)
  *H04N 21/235*     (2011.01)

(52) U.S. Cl.
  CPC ..... *H04N 21/2381* (2013.01); *H04N 21/2665* (2013.01); *H04N 21/440227* (2013.01); *H04N 21/4622* (2013.01); *H04N 21/4782* (2013.01); *H04N 21/6125* (2013.01); *H04N 21/6175* (2013.01); *H04N 21/8173* (2013.01); *H04N 21/845* (2013.01); *H04N 21/8543* (2013.01)

(56) References Cited

U.S. PATENT DOCUMENTS

| | | | | |
|---|---|---|---|---|
| 8,958,018 B2* | 2/2015 | Sibilsky | .................. | G06F 3/033 345/2.3 |
| 2004/0073941 A1 | 4/2004 | Ludvig et al. | | |
| 2005/0034166 A1 | 2/2005 | Kim et al. | | |
| 2009/0109337 A1* | 4/2009 | Imai | .................. | G06F 17/30905 348/564 |
| 2011/0084919 A1* | 4/2011 | Lee | ......................... | G06F 3/023 345/173 |
| 2012/0042102 A1* | 2/2012 | Chung | ................ | H04M 1/7253 710/33 |
| 2012/0054616 A1* | 3/2012 | Mittal | ............... | G06F 17/30899 715/722 |
| 2012/0064829 A1* | 3/2012 | Hart | ................... | H04N 21/4122 455/41.2 |
| 2012/0162536 A1* | 6/2012 | Sibilsky | .................. | G06F 3/033 348/734 |
| 2013/0219324 A1* | 8/2013 | Seo | ..................... | H04M 1/7253 715/780 |

OTHER PUBLICATIONS

International Search Report dated Mar. 27, 2015 in International Patent Application No. PCT/US2014/072847.

* cited by examiner

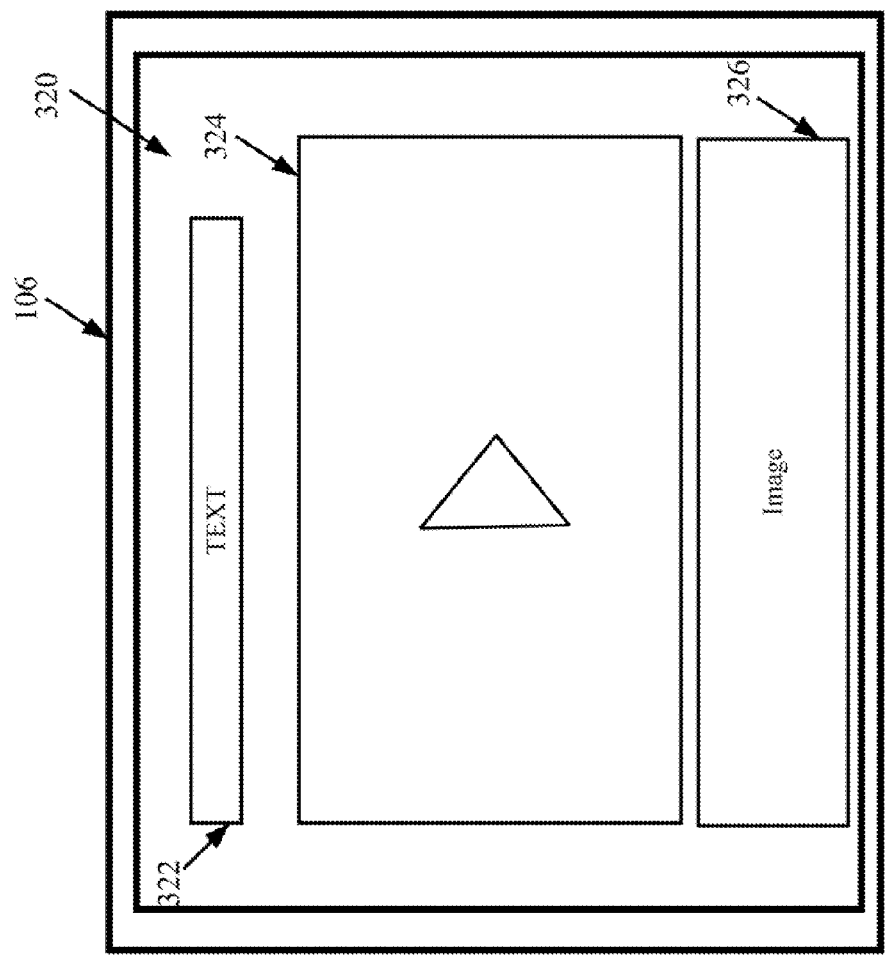
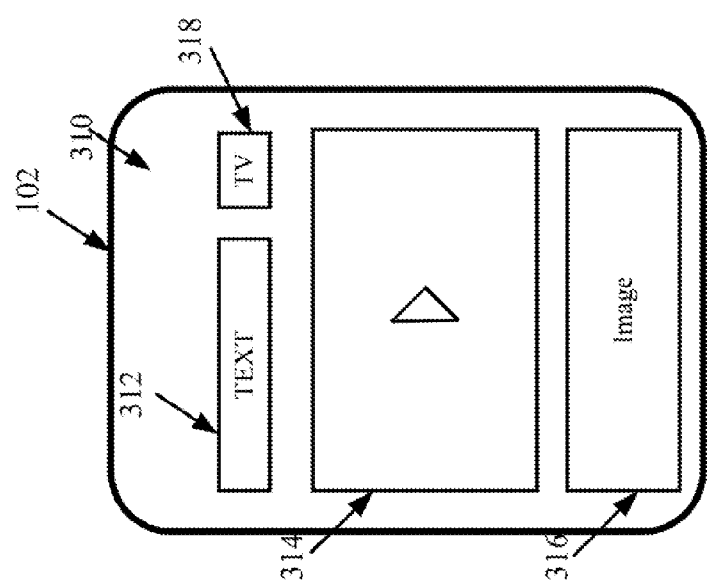
FIG. 3

METHODS, SYSTEMS, AND MEDIA FOR REMOTE RENDERING OF WEB CONTENT ON A TELEVISION DEVICE

CROSS-REFERENCE TO RELATED APPLICATION

This application claims the benefit of U.S. Provisional Application No. 61/922,277, filed on Dec. 31, 2013, which is hereby incorporated by reference herein in its entirety.

TECHNICAL FIELD

Methods, systems, and media for remote rendering of Web content on a television device are provided.

BACKGROUND

There are many current approaches to rendering Web content, such as a Web page, on a television device. For example, a user may open a Web page using a Web browser executing on a source device (e.g., a mobile phone). The source device can then capture the output of the Web browser (e.g., by taking a set of screenshots of the Web page being presented on the source device), compress the output of the Web browser as a compressed video stream, and transmit the compressed video stream to a television device. The television device can decompress the compressed video stream for display upon receiving the compressed video stream. When the Web page being presented on the source device is updated by a user input (e.g., text) or new Web content (e.g., streaming video content), the source device can capture the output of the Web browser, generate a new compressed video stream by compressing the output of the Web browser, and transmit the compressed video stream to the television device. The television device can then update the Web content presented on the television device by decompressing and playing the new compressed video stream.

However, conventional approaches have many disadvantages. For example, conventional approaches require a pipeline to render, capture, transcode, and transmit Web content that consumes a lot of power and bandwidth. As another example, the quality of the Web content displayed on a television device by the conventional approaches is significantly compromised. In a more particular example, the quality of the Web content may be limited by the resolution of the source device, the compression ratio used in the video compression processes, etc. In another more particular example, text content and other Web content may have to be presented on a television at a reduced resolution when converted to a compressed video stream.

Therefore, new mechanisms for remote rendering of Web content on a television device are desirable.

SUMMARY

Methods, systems, and media for remote rendering of Web content on a television device are provided. In some implementations, methods for remote rendering of Web content on a television device are provided, the methods comprising: sending a request for the Web content to a server, receiving, at a source device, a response corresponding to the request; generating, using a hardware processor, a set of drawing commands based on the response; obtaining at least one encoded image based on the response; presenting the Web content on the source device; generating a plurality of content layers corresponding to the Web content, wherein the plurality of content layers including a first content layer comprises the set of drawing commands and a second content layer comprises the encoded image; transmitting the plurality of content layers; and causing the Web content to be presented on the television device based on the plurality of content layers.

In some implementations, systems for remote rendering of Web content on a television device are provided, the systems comprising: a source device comprising at least one hardware processor that is configured to: send a request for the Web content to a server, receive a response corresponding to the request; generate a set of drawing commands based on the response; obtain at least one encoded image based on the response; present the Web content on the source device; generate a plurality of content layers corresponding to the Web content, wherein the plurality of content layers including a first content layer comprises the set of drawing commands and a second content layer comprises the encoded image; transmit the plurality of content layers; and cause the Web content to be presented on the television device based on the plurality of content layers.

In some implementations, non-transitory media containing computer-executable instructions that, when executed by a processor, cause the processor to perform a method for remote rendering of Web content on a television device are provided, the method comprising: sending a request for the Web content to a server, receiving, at a source device, a response corresponding to the request; generating a set of drawing commands based on the response; obtaining at least one encoded image based on the response; presenting the Web content on the source device; generating a plurality of content layers corresponding to the Web content, wherein the plurality of content layers including a first content layer comprises the set of drawing commands and a second content layer comprises the encoded image; transmitting the plurality of content layers; and causing the Web content to be presented on the television device based on the plurality of content layers.

In some implementations, systems for remote rendering of Web content on a television device are provided, the systems comprising: means for sending a request for the Web content to a server; means for receiving a response corresponding to the request; means for generating a set of drawing commands based on the response; means for obtaining at least one encoded image based on the response; means for presenting the Web content on the source device; means for generating a plurality of content layers corresponding to the Web content, wherein the plurality of content layers including a first content layer comprises the set of drawing commands and a second content layer comprises the encoded image; means for transmitting the plurality of content layers; and causing the Web content to be presented on the television device based on the plurality of content layers.

In some implementations, the Web content includes a Web page.

In some implementations, the systems further comprise means for obtaining a first plurality of encoded frames based on the response; and means for presenting the Web content on the source device based at least in part on the first plurality of encoded frames.

In some implementations, the plurality of content layers further comprises a third content layer including a video stream.

In some implementations, the video stream includes the first plurality of encoded frames.

In some implementations, the video stream includes transcoded video content generated based on the first plurality of encoded frames.

In some implementations, the systems further comprise: means for receiving a second plurality of encoded frames; means for generating a fourth content layer based on the second plurality of encoded frames; and means for transmitting the fourth content layer.

In some implementations, the systems further comprise: means for receiving, at a digital media receiver, the plurality of content layers; means for processing the plurality of content layers; and means for causing the Web content to be presented on the television device based on the processed plurality of content layers.

In some implementations, the systems further comprise: means for receiving a user input of text content; means for generating at least one drawing command corresponding to the user input; and means for causing the text content to be rendered on the television device based at least in part on the drawing command corresponding to the user input.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 shows an example of a user interface for presenting Web content on a source device and a corresponding user interface for presenting Web content on a television device in accordance with some implementations of the disclosed subject matter.

DETAILED DESCRIPTION

Figure 1:
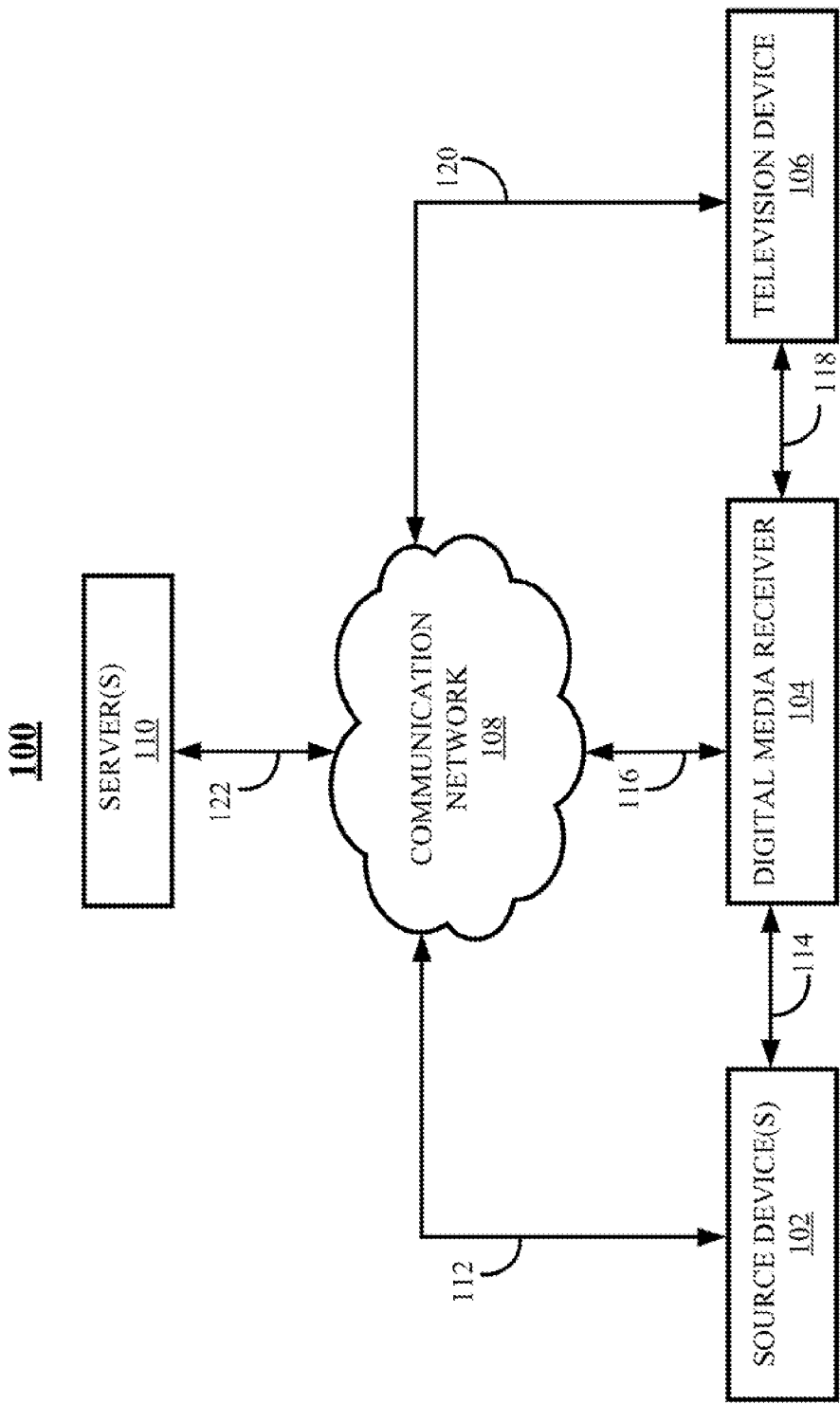
FIG. 1 shows a generalized block diagram of an example of a system for remote rendering of Web content on a television device in accordance with some implementations of the disclosed subject matter.

In accordance with various implementations, as described in more detail below, mechanisms, which can include systems, methods, and computer-readable media, for remote rendering of Web content on a television device are provided.

As referred to herein, Web content can include Web pages, images, video content, audio content, and/or any other suitable content that can be provided by a server.

In some implementations, the mechanisms can be implemented by a source device (e.g., a mobile phone, a tablet computer, a desktop computer, and/or any other suitable source device), a digital media receiver, a television device, and/or any other suitable device. In some implementations, the source device can present Web content, such as a Web page, to a user using a suitable mechanism that is capable of rendering Web content (e.g., a Web browser).

In some implementations, in response to a user request to present the Web content on the television device, the source device can generate a set of content layers based on which the Web content can be rendered on the television device. For example, the source device can generate a drawing commands layer including a set of drawing commands based on which one or more graphic elements (e.g., text, a path, a rectangular, an image, and/or any other suitable graphic element), video objects, and/or any other suitable component of the Web content can be presented on the television device. As another example, the source device can generate an image layer that includes one or more encoded images based on which the Web content can be rendered on the television. As yet another example, the source device can generate a video layer including one or more video streams based on which video content contained in the Web content can be presented by the television device.

In some implementations, the digital media receiver can receive the set of content layers generated by the source device and cause the Web content to be presented on the television device based on the set of content layers. For example, the digital media receiver can process the set of content layers (e.g., by generating one or more graphic elements, decoding the encoded images, decoding the video streams, and/or processing the content layers in any other suitable manner) and combining the processed content layers for presentation.

In some implementations, the source device can generate an updated set of content layers when the Web content presented on the source device is updated. For example, in response to receiving a user input of text content (e.g., a set of characters), the source device can generate one or more drawing commands based on which the text content can be presented on the television device. In a more particular example, the drawing commands can include information about the set of characters, one or more stylistic attributes of the text content (e.g., a font style), and/or any other suitable information about the manner in which the text content can be rendered on the television device.

As another example, in response to receiving new image content, such as one or more encoded images, from a server, the source device can generate an image layer based on the new image content. In a more particular example, the image layer can include the encoded images received from the server.

As yet another example, in response to receiving new video content, such as encoded video content streamed from a server, the source device can generate a video layer based on the new video content. In a more particular example, the video layer can include the encoded video content streamed from the server. In another more particular example, the video layer can include transcoded video content derived from the encoded video content in some implementations in which the digital media receiver is not capable of processing the encoded video content.

Turning to FIG. 1, a generalized block diagram of an example 100 of a system for remote rendering of Web content on a television device in accordance with some implementations of the disclosed subject matter is shown. As illustrated, system 100 can include one or more source devices 102, a digital media receiver 104, a television device 106, a communication network 108, one or more servers 110, communication paths 112, 114, 116, 118, 120, and 122, and/or any other suitable components.

Source device(s) 102 can be any suitable device that is capable of communicating with a digital media receiver and/or a server, receiving, processing and/or rendering Web content, generating content layers for Web content, causing Web content to be presented via a digital media receiver, causing Web content to be presented on television device 106, and/or performing any other suitable functions. Examples of source devices can include a mobile phone, a laptop computer, a tablet computer, a desktop computer, a wearable computer, and/or any other suitable device.

Digital media receiver 104 can be any suitable device that is capable of receiving, processing, converting, and/or transmitting media content, receiving and/or processing content layers corresponding to Web content, causing Web content to be presented on television device 106, communicating with a source device and/or a server, and/or performing any other suitable functions. Examples of digital media receivers include a streaming media player, a media center computer, a game console, a laptop computer, a desktop computer, a tablet computer, and/or any other suitable device.

Television device 106 can be any suitable device that is capable of receiving, converting, processing, and/or displaying media content and/or performing any other suitable functions, such as a media center computer, a CRT display, an LCD, an LED display, a plasma display, a touch-screen display, a simulated touch screen, a television device, a tablet user device, a mobile phone, a gaming console, and/or any other suitable device. In some implementations, television device 106 can be three-dimensional capable.

Communication network 108 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

Server(s) 110 can include any suitable device that is capable of providing Web content to source device(s) 102 and/or performing any other suitable functions.

In some implementations, source device(s) 102 can receive Web content (e.g., a Web page) from server(s) 110 and can present the Web content to a user. For example, as shown in FIG. 3, the Web content can be presented on source device(s) 102 using a user interface 310. As illustrated, user interface 310 can include a text box 312, a video playback area 314, an image 316, a streaming button 318, and/or any other suitable component.

In some implementations, source device 102 can cause the Web content to be presented on television device 106 in response to a user request (e.g., a user selection of streaming button 318). For example, as described hereinbelow in connection with FIGS. 4-6, source device 102 can generate a set of content layers corresponding to the Web content and transmit the content layers to digital media receiver 104. In some implementations, the set of content layers can include a drawing command layer that includes one or more drawing commands, an image layer including one or more encoded images, a video layer including one or more video streams, an audio layer including audio data, and/or any other suitable content layer that can be used to present the Web content on television device.

In some implementations, digital media receiver 104 can process the content layers and cause the Web content to be presented on television device 106 in response to receiving the content layers. In some implementations, digital media receiver 104 can cause a user interface 320 corresponding to interface 310 to be presented on television device 106. As illustrated in FIG. 3, user interface 320 can include a text box 322 corresponding to text box 312, a video playback area 324 corresponding to playback area 314, an image 326 corresponding to image 316, and/or any other suitable component.

Referring back to FIG. 1, in some implementations, source device(s) 102, digital media receiver 104, television device 106, and server(s) 110 can be connected to communication network 108 through communication links 112, 116, 120 and 122, respectively. In some implementations, digital media receiver 104 can be connected to source device 102 and television device 106 through communication links 114 and 118, respectively. In some implementations, communication links 112, 114, 116, 118, 120, and 122 can be any suitable communication links, such as network links, dial-up links, wireless links, hard-wired links, any other suitable communication links, or a combination of such links.

In some implementations, each of source device(s) 102, digital media receiver 104, television device 106, and server(s) 110 can be implemented as a stand-alone device or integrated with other components of system 100. For example, digital media receiver 104 and television device 106 can be implemented as one device in some implementations.

Figure 2:
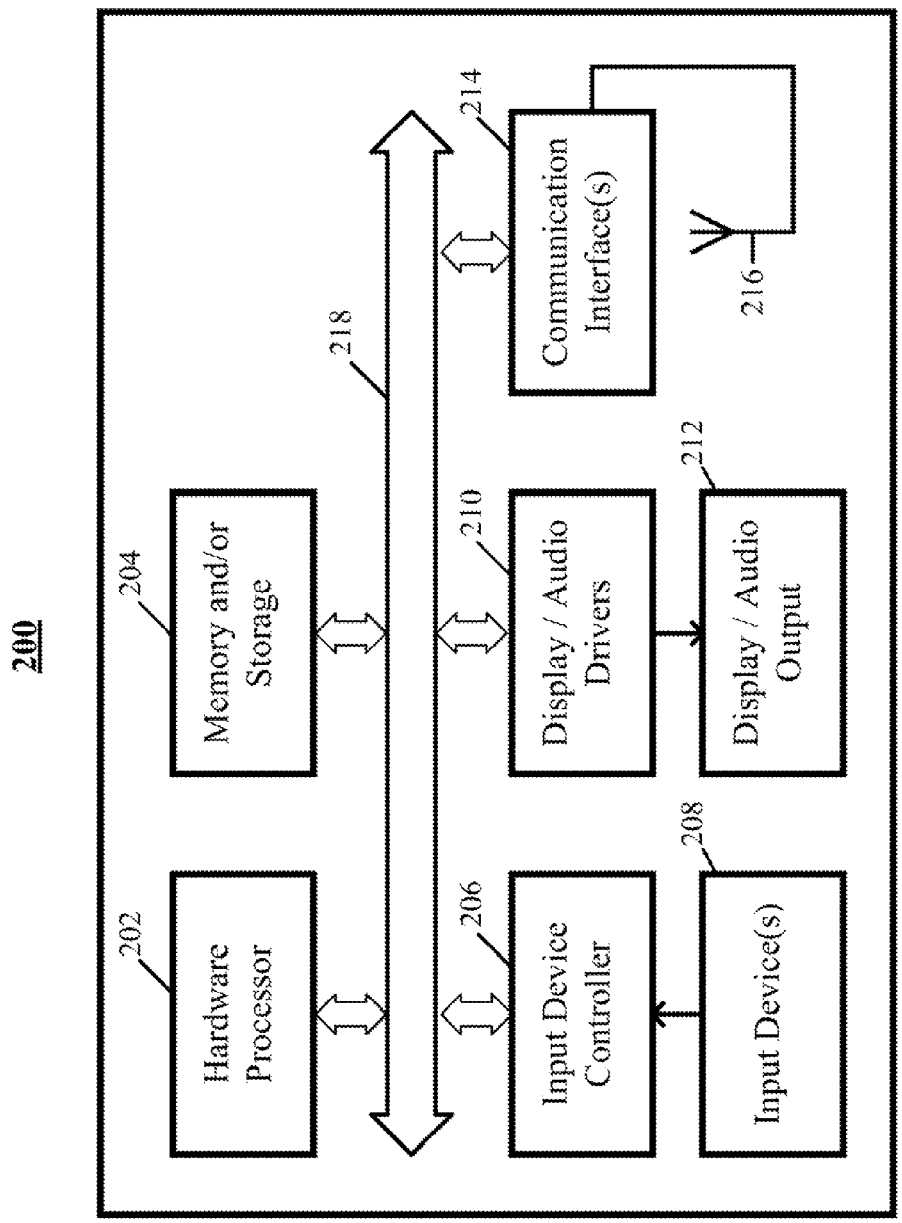
FIG. 2 shows an example of hardware that can be used in a source device, a digital media receiver, a server, and/or a television device in accordance with some implementations of the disclosed subject matter.

Each of source device(s) 102, digital media receiver 104, television device 106, and server(s) 110 can include and/or be any of a general purpose device such as a computer or a special purpose device such as a client, a server, and/or any other suitable device. Any such general purpose computer or special purpose computer can include any suitable hardware. For example, as illustrated in example hardware 200 of FIG. 2, such hardware can include a hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor, dedicated logic, and/or any other suitable circuitry for controlling the functioning of a general purpose computer or special purpose computer in some implementations.

Memory and/or storage 204 can be any suitable memory and/or storage for storing programs, data, media content, and/or any other suitable content in some implementations. For example, memory and/or storage 204 can include random access memory, read only memory, flash memory, hard disk storage, optical media, and/or any other suitable storage device.

Input device controller 206 can be any suitable circuitry for controlling and receiving input from one or more input devices 208 in some implementations. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 210 can be any suitable circuitry for controlling and driving output to one or more display and audio output circuitries 212 in some implementations. For example, display/audio drivers 210 can be circuitry for driving an LCD display, a speaker, an LED, and/or any other display/audio device.

Communication interface(s) 214 can be any suitable circuitry for interfacing with one or more communication networks, such as communication network 104 in some implementations. For example, interface(s) 214 can include network interface card circuitry, wireless communication circuitry, and/or any other suitable circuitry for interfacing with one or more communication networks.

Antenna 216 can be any suitable one or more antennas for wirelessly communicating with a communication network in some implementations. In some implementations, antenna 216 can be omitted when not needed.

Bus 218 can be any suitable mechanism for communicating between two or more of components 202, 204, 206, 210, and 214 in some implementations.

Any other suitable components can be included in hardware 200 in accordance with some implementations.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 4:
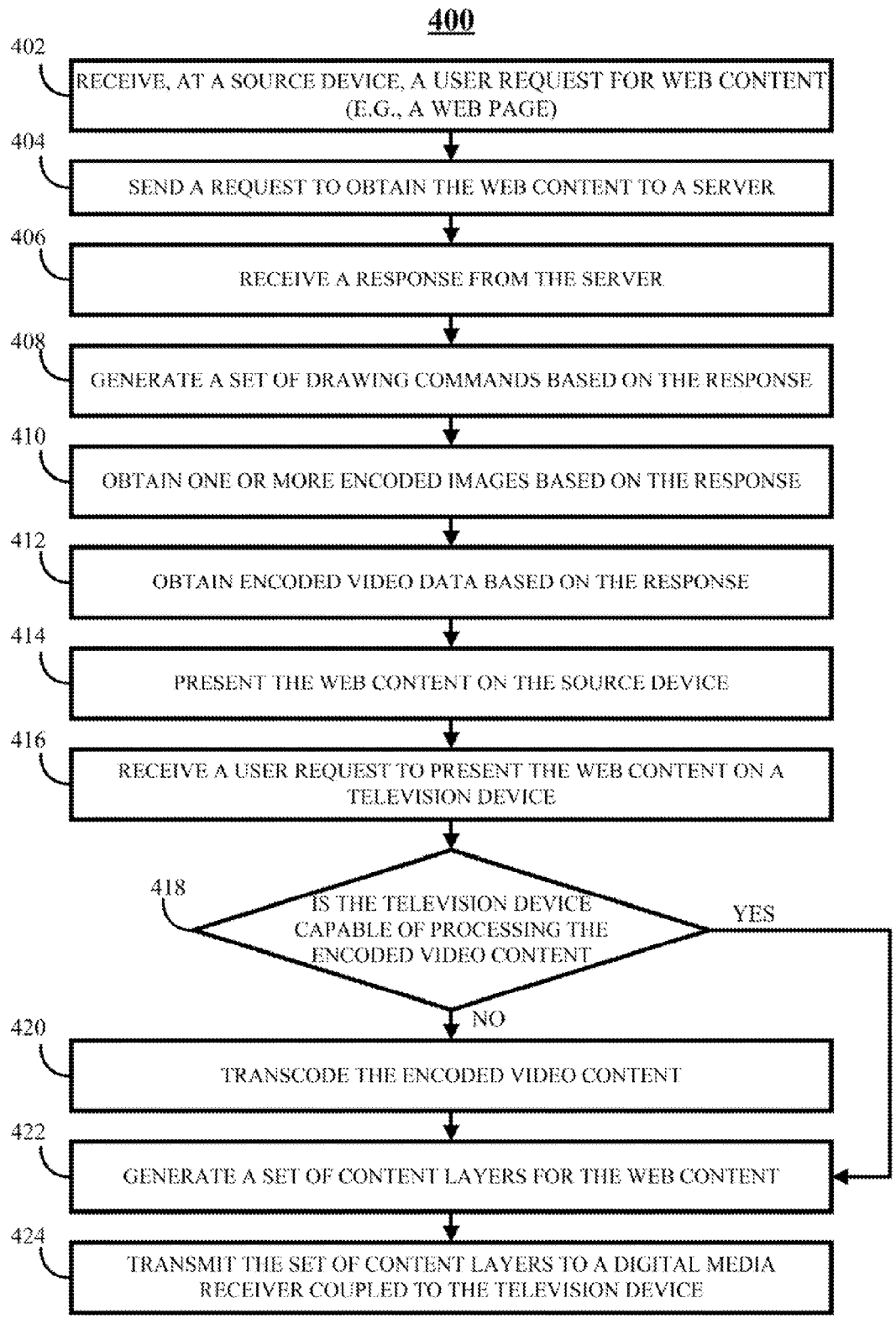
FIG. 4 shows a flow chart of an example of a process for remote rendering of Web content on a television device in accordance with some implementations of the disclosed subject matter.

Turning to FIG. 4, a flow chart of an example 400 of a process for remote rendering of Web content on a television device in accordance with some implementations of the disclosed subject matter is shown. In some implementations, process 400 can be implemented by a hardware processor of one or more suitable components of system 100 of FIG. 1, such as one or more source devices 102.

As illustrated, process 400 can begin by receiving a user request for Web content at 402. The user request can be received in any suitable manner. For example, the user request can be received as a user entering a Uniform Resource Identifier (URI) associated with the Web content in a suitable Web browser. As another example, the user request can be received as a user searching for the Web content using a suitable search mechanism. As yet another example, the user request can be received as a user selection of a hyperlink associated with the Web content.

At 404, process 400 can send to a server a request to obtain the Web content. The request can include any suitable information and can be sent in any suitable manner. For example, the request message can include one or more identifiers that can identify the name of the requested content, the location of the requested content, a server that can provide the requested content, and/or any other suitable information that can be used to identify and/or retrieve the requested content. In some implementations, the request can be generated and/or transmitted using any suitable communication protocol, such as the Hypertext Transfer Protocol (HTTP), the Hypertext Transfer Protocol Secure (HTTPS), the File Transfer Protocol (FTP), and/or any other suitable communication protocol.

At 406, process 400 can receive a response from the server. The response can include any suitable information corresponding to the requested Web content. For example, the response can include the requested Web content (e.g., a requested file), data that can be used to render the requested Web content (e.g., one or more HyperText Markup Language (HTML) files, scripts, style sheets, and/or any other suitable data that can be used to render a Web page), and/or any other suitable data. In some implementations, the response can be received in any suitable manner. For example, the response can be received via one or more response messages (e.g., HTTP response messages).

At 408, process 400 can generate a set of drawing commands based on the response. The drawing commands can be generated in any suitable manner. For example, the drawing commands can be generated based on the HTML files, scripts, style sheets, and/or any other suitable data received with the response. As another example, the drawing commands can be generated based on a graphic library for drawing graphic elements, such as text, geometries (e.g., a path, a rectangle, and/or any other suitable geometry), images, and/or any other suitable graphic elements.

In some implementations, the set of drawing commands can include any suitable instructions and/or functions that can be used to present the Web content. For example, the set of drawing commands can include information that can be used to present one or more graphic element of the Web content, such as text, geometries (e.g., a path, a rectangle, and/or any other suitable geometry), images, and/or any other suitable graphic elements. In a more particular example, the set of drawing commands can include a set of coordinates that define the position of a graphic element on a screen, stylistic attributes of the graphic element (e.g., a color, a font style, one or more effects applied to graphic element such as a filled shadow, a gradient shadow, and/or any other suitable stylistic attribute), the manner in which the graphic element is to be blended with other graphic elements of the Web content, and/or any other suitable information that can be used to present the graphic element.

As another example, the set of drawing commands can include one or more drawing commands defining one or more video playback areas in which video content can be presented. In a more particular example, the set of drawing commands can include information about the size of a video playback area (e.g., the width and the height of the video playback area defined by a number of pixels and/or a percentage of a screen), the position of the video playback area on a screen, and/or any other suitable properties of the video playback area.

At 410, process 400 can obtain one or more encoded images based on the response. The encoded image(s) can have any suitable format, such as JPEG, WEBP, PNG, GIF, and/or any other suitable format. In some implementations, the encoded image(s) can be obtained in any suitable manner. For example, process 400 can identify one or more identifiers (e.g., URIs) associated with the encoded image(s) in an HTML document received at 406. Process 300 can then retrieve the encoded image(s) from a resource identified by the identifier(s), such as a server, a local storage device, and/or any other suitable resource.

At 412, process 400 can obtain encoded video content based on the response. The encoded video content can include a set of encoded and/or encrypted frames, parameters that can be used to decode, decrypt, process, and/or present the set of encoded/encrypted frames, and/or any other suitable video data. In some implementations, the encoded video content can be obtained in any suitable manner. For example, process 300 can identify one or more identifiers (e.g., URIs) associated with the encoded video content in an HTML document received at 406. Process 400 can then retrieve the encoded video content from a resource identified by the identifier(s), such as a server, a local storage device, and/or any other suitable resource.

At 414, process 400 can present the Web content on the source device. The Web content can be presented in any suitable manner. For example, the Web content can be presented using a suitable Web browser, a mobile application, and/or any other suitable mechanism that can present Web content on a source device. In some implementations, the Web content can be presented on the source device using a suitable user interface, such as a user interface 310 of FIG. 3. In some implementations, the encoded image(s) obtained at 410 can be decoded, decrypted, transformed to a suitable color space, and/or processed in any other suitable manner and can be presented as image 316 of user interface 310. In some implementations, the encoded video content obtained at 412 can be decoded, decrypted, transformed to a suitable color space, and/or processed in any other suitable manner and can be presented in video playback area 314 of user interface 310.

At 416, process 400 can receive a user request to present the Web content on a television device. The request can be received in any suitable manner. For example, the request can be received as being a user selection of a streaming button of a user interface (e.g., streaming button 318 of user interface 310 as shown in FIG. 3), one or more voice commands, one or more control signals transmitted from a remote control, and/or any other suitable input.

At 418, process 400 can determine whether the television device is capable of processing the encoded video content for presentation. This determination can be made in any suitable manner. For example, the television device can be determined as being capable of processing the encoded video content for presentation when the television device and/or a digital media receiver coupled to the television device is capable of decoding the encoded video content and/or processing the encoded video content in any other suitable manner for presentation. In some implementations, process 400 can obtain information about the decoding capabilities of the television device and/or the digital media receiver via the Universal Plug and Play (UPnP) and/or any other suitable communication protocol.

In some implementations, in response to determining that the television device is incapable of processing the encoded video content for presentation, process 400 can generate transcoded video content based on the encoded video content. For example, process 400 can convert the encoded video content to a suitable format that can be processed by the television device and/or the digital media receiver. In a more particular example, process 400 can decode and/or decrypt the encoded video content to generate decoded video content. Process 400 can then encode the decoded video content in the suitable format.

In some implementations, process 400 can generate a set of content layers for the Web content at 422 in response to determining that the television device is capable of processing the encoded video content at 418 or after generating the transcoded video stream at 420. For example, the set of content layers can include a drawing command layer including one or more drawing commands based on which the Web content can be presented on the television device. In some implementations, the drawing command layer can include the drawing commands generated at 408.

As another example, the set of content layers can include an image layer including one or more encoded images. In a more particular example, the image layer can include the encoded image(s) obtained at 410.

As yet another example, the set of content layers can include a video layer including one or more video streams. In a more particular example, the video stream(s) can include the encoded video content obtained at 412 in some implementations in which the television device is determined as being capable of processing the encoded video content. In another more particular example, the video stream can include the transcoded video content generated at 420 in some implementations in which the television device is determined as being incapable of processing the encoded video content obtained at 412.

Next, at 424, process 300 can transmit the set of content layers to a digital media receiver coupled to the television device. The set of content layers can be transmitted in any suitable manner. For example, the set of content layers can be transmitted via a suitable network, such as a WIFI network.

Figure 5:
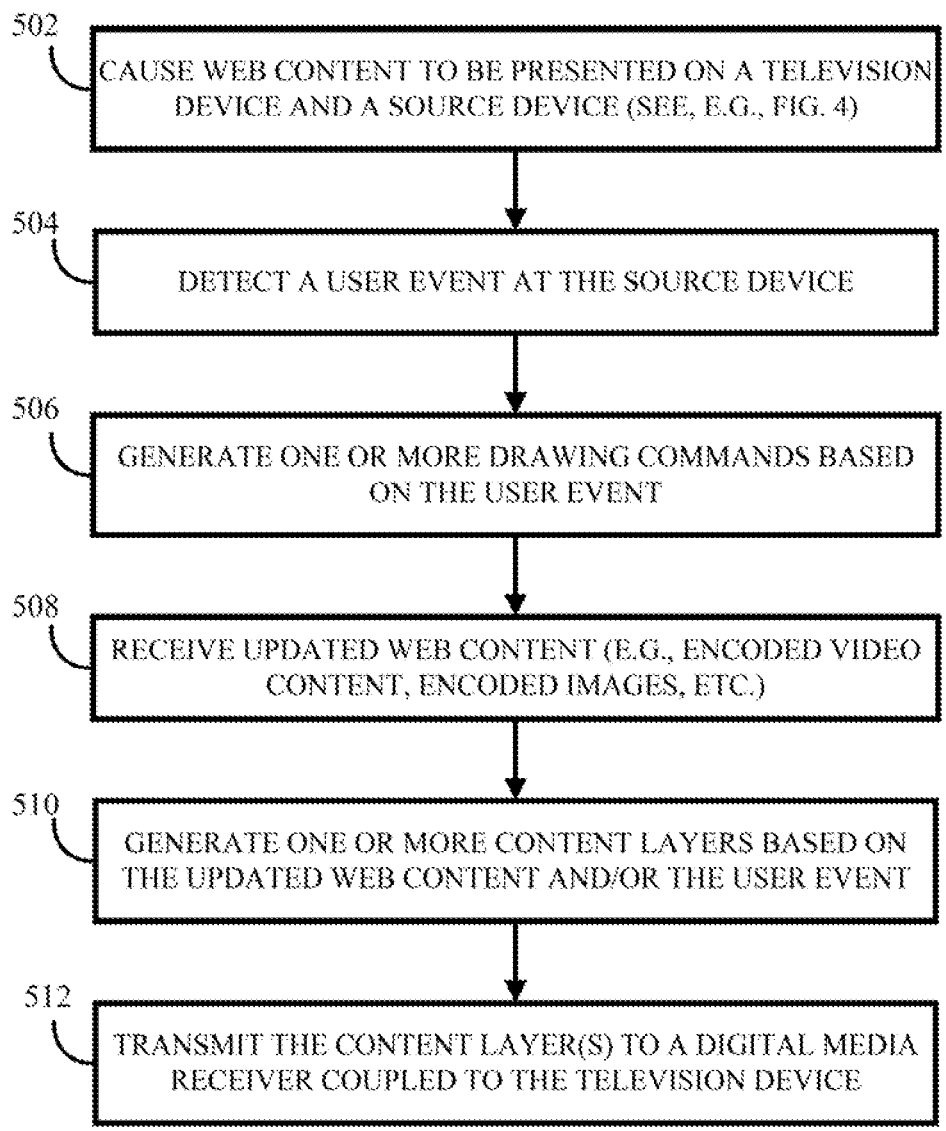
FIG. 5 shows a flow chart of an example of a process for updating Web content being presented on a television device in accordance with some implementations of the disclosed subject matter.

Turning to FIG. 5, a flow chart of an example 500 of a process for updating Web content presented on a television device in accordance with some implementations of the disclosed subject matter is shown. In some implementations, process 500 can be implemented by a hardware processor of one or more suitable components of system 100 of FIG. 1, such as one or more source devices 102.

As illustrated, process 500 can begin by causing Web content to be presented on a source device and a television device at 502. The Web content can be rendered in any suitable manner. For example, the Web content can be presented on the source device and the television device using process 400 of FIG. 4 as described above.

At 504, process 500 can detect a user event at the source device. Examples of a user event include a user entering text content, a user moving a mouse, a user scrolling up or scrolling down the Web content presented on the source device, a user selection of an image displayed on the source device, and/or any other suitable user event.

At 506, process 500 can generate one or more drawing commands based on the detected user event. For example, in some implementations in which the detected user event corresponds to a user entering text in a text box (e.g., a text box 312 of FIG. 3), process 500 can generate one or more drawing commands that can cause the text to be presented on the television device. In a more particular example, the drawing commands can include the text entered by the user, one or more stylistic attributes of the text (e.g., a font style, a color, and/or any other suitable stylistic attribute), the position of the text, and/or any other suitable information about the text and/or the manner in which the text information is to be presented by the television device (e.g., a text box of 322 of FIG. 3 that corresponds to text box 312).

As another example, in some implementations in which the detected user event corresponds to a user scrolling up/down the Web content being presented on the source device, process 500 can generate one or more drawing commands that can cause the Web content being presented on the television device to be scrolled accordingly.

In some implementations, at 508, process 500 can receive updated Web content from a server. Any suitable Web content can be received in a suitable manner. For example, the updated Web content can include updated image content, such as one or more encoded images. In a more particular example, process 500 can receive an encoded image in response to a user selection of a hyperlink associated with the encoded image and/or a version of the encoded image (e.g., a thumbnail of the encoded image).

As another example, the updated Web content can include updated video content, such as a set of encoded frames, parameters that can be used to decode, decrypt, process, and/or present the encoded frames, and/or any other suitable video data. In a more particular example, the updated video content can be received in response to a user request to playback the updated video content (e.g., a user selection of a "play" button using a user interface presented on the source device, a remote control, and/or any other suitable device). In another more particular example, in some implementations in which video content is presented in a video playback area on the source device and/or the television device (e.g., in video playback areas 314 and 324 of FIG. 3), the updated video content can correspond to new video content to be presented in the video playback area.

At 510, process 500 can generate one or more updated content layers corresponding to the updated Web content and/or the user event. For example, process 500 can generate a drawing command layer including one or more drawing commands based on which the Web content being presented on the television device can be updated. In a more particular example, the drawing command layer can include the drawing commands generated at 506. In another more particular example, the drawing command layer can include one or more drawing commands defining the manner in which the updated video content and/or the update image content is to be rendered, such as the size of a video playback area in which the updated video content can be rendered, positional information about the updated video content and/or the updated image content, and/or any other suitable information based on which the updated video content and/or the updated image content is to be presented.

As another example, process 500 can generate an image layer that corresponds to the updated image content. In a more particular example, the image layer can include one or more encoded images received at 508.

As yet another example, process 500 can generate a video layer that corresponds to the updated video content. In a more particular example, the video layer can include the encoded video content received at 508. In another more particular example, the video layer can include transcoded video content derived from the encoded video content received at 508 (e.g., by decoding the encoded video content and encoding the decoded video content in a suitable format).

At 512, process 500 can transmit the content layer(s) to a digital media receiver coupled to the television device. The content layer(s) can be transmitted in any suitable manner. For example, the set of content layers can be transmitted via a suitable network, such as a WIFI network.

Figure 6:
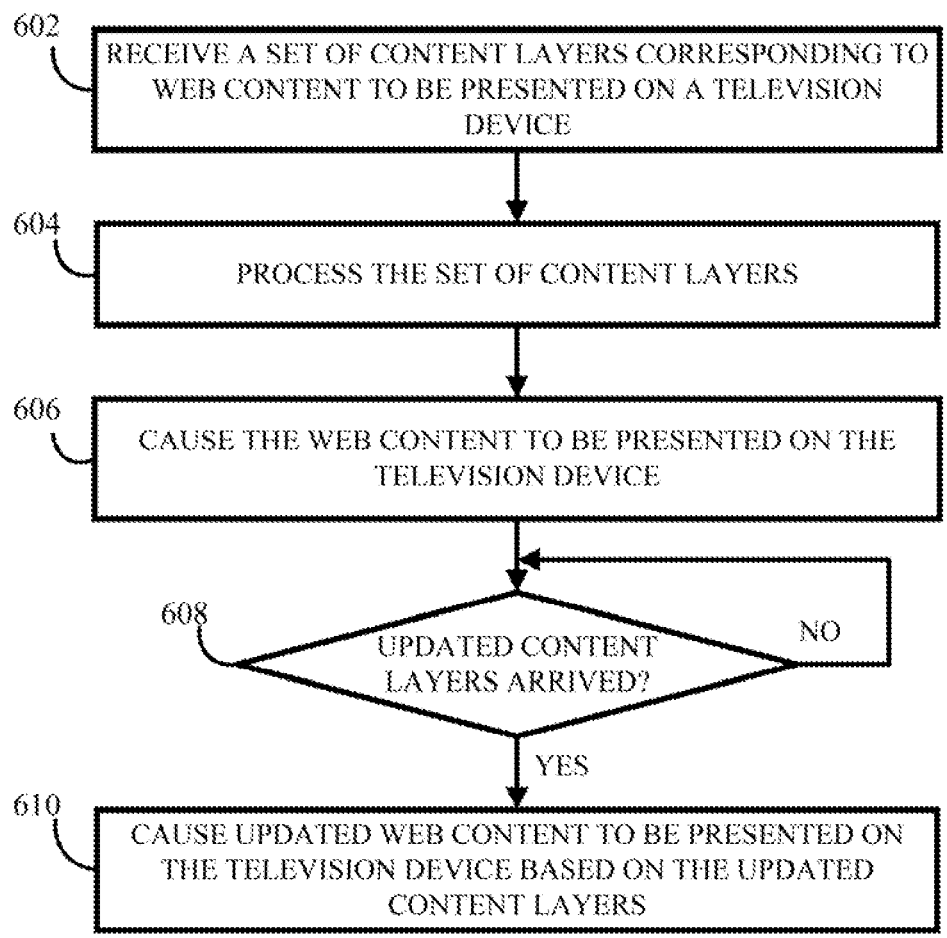
FIG. 6 shows a flow chart of an example of a process for presenting and updating Web content on a television device based on a set of content layers in accordance with some implementations of the disclosed subject matter.

Turning to FIG. 6, a flow chart of an example 600 of a process for presenting and updating Web content on a television device based on content layers corresponding to the Web content in accordance with some implementations of the disclosed subject matter is shown. In some implementations, process 600 can be implemented by a hardware processor of one or more suitable components of system 100 of FIG. 1, such as a digital media receiver 104.

As illustrated, process 600 can begin by receiving a set of content layers corresponding to Web content to be presented on a television device at 602. In some implementations, the set of content layers can be generated and transmitted as described above in connection with FIG. 4. For example, the set of content layers can include a drawing command layer including one or more drawing commands, an image layer including one or more encoded images, a video layer including one or more video streams, an audio layer including audio data, and/or any other suitable content layer.

Next, at 604, process 600 can process the set of content layers. For example, process 600 can process the encoded image(s) of the image layer by decoding the encoded image(s) to generate one or more decoded images, resizing the decoded images, and/or processing the encoded image(s) in any other suitable manner. As another example, process 600 can process the video stream of the video layer by decoding the encoded video content, performing a color space transformation, and/or processing the video stream in any other suitable manner.

At 606, process 600 can cause the Web content to be presented on a television device. For example, process 600 can present one or more graphic elements based on one or more of the drawing commands. In a more particular example, process 600 can determine the type of a graphic element (e.g., text, a path, a rectangle, a text box, an image, and/or any other suitable graphic element), the stylistic attributes of the graphic element, and/or any other suitable attribute of the graphic element based on one or more of the drawing commands. In another more particular example, process 600 can create the graphic element and present the graphic element on the television device based on the positional information contained in one or more of the drawing commands.

As another example, process 600 can cause the decoded image to be presented on the television device based on one or more of the drawing commands. In a more particular example, process 600 can place the decoded image based on a set of coordinates included in one or more of the drawing commands that define the position of the decoded images. In another more particular example, process 600 can apply one or more suitable effects to the decoded images (e.g., a filled shadow, a gradient shadow, and/or any other suitable effect) based on one or more of the drawing commands.

As yet another example, process 600 can present the decoded video content based on one or more of the drawing commands. In a more particular example, process 600 can identify a video playback area (e.g., a video playback area 324 of FIG. 3) defined by one or more of the drawing commands. Process 600 can then cause the decoded video content to be presented in the video playback area.

In some implementations, process 600 can combine the processed content layers and present the combined content on the television device. In a more particular example, one or more bitmaps can be generated and the screen can be painted based on the bitmap(s).

At 608, process 600 can determine whether an updated set of content layers have arrived at the digital media receiver. In some implementations, the updated set of content layers can be generated and/or transmitted based on process 500 of FIG. 5 as described above. For example, the updated content layers can include a drawing command layer that including an updated set of drawing commands, an image layer including one or more encoded images that correspond to updated image content received by the source device, a video layer including encoded video content that corresponds to updated video content received by the source device, and/or any other suitable content layer.

In some implementations, at 610, process 600 can cause updated Web content to be presented on the television device in response to receiving the updated set of content layers. For example, process 600 can process the updated set of drawing commands and cause one or more graphic element to be updated and/or presented on the television device. In a more particular example, in some implementations in which the updated set of drawing commands corresponds to a user entering text content on the source device, process 600 can cause the text to be presented on the television device based on the text entered by the user, one or more stylistic attributes of the text, and/or any other suitable information relating to presenting the text.

As another example, process 600 can decode the encoded images corresponding to the updated image content. Process 600 can then present the decoded images based on the drawing commands (e.g., by applying one or more effects defined by one or more of the drawing commands).

As yet another example, process 600 can process the updated video data (e.g., by decoding the updated video data, performing a color space transformation on the updated video data, and/or processing the updated video data in any satiable manner). Process 600 can then present the processed video data on the television device (e.g., in a video playback area defined by one or more of the drawing commands).

It should be noted that the above steps of the flow diagrams of FIGS. 4-6 can be executed or performed in any order or sequence not limited to the order and sequence shown and described in the figures. Also, some of the above steps of the flow diagrams of FIGS. 4-6 can be executed or performed substantially simultaneously where appropriate or in parallel to reduce latency and processing times. Furthermore, it should be noted that FIGS. 4-6 are provided as examples only. At least some of the steps shown in these figures may be performed in a different order than represented, performed concurrently, or altogether omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for remote rendering of Web content on a television device are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A method for remote rendering Web content on a television device, the method comprising:
   sending a request for the Web content to a server;
   receiving, at a source device, a response corresponding to the request;
   generating, using a hardware processor of the source device, a set of drawing commands based on the response;
   obtaining, using the hardware processor of the source device, at least one encoded image and at least one encoded video based on the response;
   presenting, using the hardware processor of the source device, the Web content on the source device;
   generating, using the hardware processor of the source device, a first content layer corresponding to the Web content, that comprises the set of drawing commands;
   generating, using the hardware processor of the source device, a second content layer corresponding to the Web content, that comprises the at least one encoded image;
   generating, using the hardware processor of the source device, a transcoded video stream based on the at least one encoded video;
   generating, using the hardware processor of the source device, a third content layer corresponding to the Web content that comprises the transcoded video stream;
   transmitting from the hardware processor of the source device to a digital media receiver, the first content layer, the second content layer, and the third content layer;
   causing the at least one encoded image to be decoded at the digital media receiver; and
   causing the Web content to be presented on the television device, via the digital media receiver, based on the first content layer, the second content layer, and the third content layer.

2. The method of claim 1, wherein the Web content includes a Web page.

3. The method of claim 1, further comprising:
   obtaining a first plurality of encoded frames based on the response; and
   presenting the Web content on the source device based at least in part on the first plurality of encoded frames.

4. The method of claim 3, wherein the video stream includes the first plurality of encoded frames.

5. The method of claim 3, wherein the video stream includes transcoded video content generated based on the first plurality of encoded frames.

6. The method of claim 3, further comprising:
   receiving a second plurality of encoded frames;
   generating a fourth content layer based on the second plurality of encoded frames; and
   transmitting the fourth content layer.

7. The method of claim 1, further comprising:
   receiving, at the source device, a user input of text content;
   generating at least one drawing command corresponding to the user input; and
   causing the text content to be rendered on the television device based at least in part on the drawing command corresponding to the user input.

8. A system for remote rendering Web content on a television device, the system comprising:
   a source device comprising at least one hardware processor that is configured to:
   send a request for the Web content to a server;
   receive a response corresponding to the request;
   generate a set of drawing commands based on the response;
   obtain at least one encoded image and at least one encoded video based on the response;
   present the Web content on the source device;
   generate a first content layer corresponding to the Web content, that comprises the set of drawing commands;
   generate a second content layer corresponding to the Web content, that comprises the at least one encoded image;
   generate a transcoded video stream based on the at least one encoded video;
   generate a third content layer corresponding to the Web content that comprises the transcoded video stream;

transmit, to a digital media receiver, the first content layer, the second content layer, and the third content layer;

cause the at least one encoded image to be decoded at the digital media receiver; and cause the Web content to be presented on the television device, via the digital media receiver, based on the first content layer, the second content layer, and the third content layer.

9. The system of claim 8, wherein the Web content includes a Web page.

10. The system of claim 8, wherein the hardware processor is further configured to:

obtain a first plurality of encoded frames based on the response; and present the Web content on the source device based at least in part on the first plurality of encoded frames.

11. The system of claim 10, wherein the video stream includes the first plurality of encoded frames.

12. The system of claim 10, wherein the video stream includes transcoded video content generated based on the first plurality of encoded frames.

13. The system of claim 10, wherein the hardware processor is further configured to:

receive a second plurality of encoded frames;

generate a fourth content layer based on the second plurality of encoded frames; and transmit the fourth content layer.

14. The system of claim 8, wherein the hardware processor is further configured to:

receive a user input of text content;

generate at least one drawing command corresponding to the user input; and cause the text content to be rendered on the television device based at least in part on the drawing command corresponding to the user input.

15. A non-transitory computer-readable medium containing computer-executable instructions that, when executed by a processor of a source device, cause the processor to perform a method for remote rendering Web content on a television device, the method comprising:

sending a request for the Web content to a server;

receiving, at the source device, a response corresponding to the request;

generating a set of drawing commands based on the response;

obtaining at least one encoded image and at least one encoded video based on the response;

presenting the Web content on the source device;

generating a first content layer corresponding to the Web content, that comprises the set of drawing commands;

generating a second content layer corresponding to the Web content, that comprises the at least one encoded image;

generating a transcoded video stream based on the at least one encoded video;

generating a third content layer corresponding to the Web content that comprises the transcoded video stream;

transmitting, to a digital media receiver, the first content layer, the second content layer, and the third content layer;

causing the at least one encoded image to be decoded at the digital media receiver; and causing the Web content to be presented on the television device, via the digital media receiver, based on the first content layer, the second content layer, and the third content layer.

16. The non-transitory computer-readable medium of claim 15, wherein the Web content includes a Web page.

17. The non-transitory computer-readable medium of claim 15, wherein the method further comprises:

obtaining a first plurality of encoded frames based on the response; and presenting the Web content on the source device based at least in part on the first plurality of encoded frames.

18. The non-transitory computer-readable medium of claim 17, wherein the video stream includes the first plurality of encoded frames.

19. The non-transitory computer-readable medium of claim 17, wherein the video stream includes transcoded video content generated based on the first plurality of encoded frames.

20. The non-transitory computer-readable medium of claim 17, wherein the method further comprises:

receiving a second plurality of encoded frames;

generating a fourth content layer based on the second plurality of encoded frames; and transmitting the fourth content layer.

21. The non-transitory computer-readable medium of claim 15, wherein the method further comprises:

receiving, at the source device, a user input of text content;

generating at least one drawing command corresponding to the user input; and causing the text content to be rendered on the television device based at least in part on the drawing command corresponding to the user input.

* * * * *